United States Patent [19]

Agostini

[11] Patent Number: 6,053,226
[45] Date of Patent: Apr. 25, 2000

[54] RUBBER COMPOSITION REINFORCED WITH SILICA AND TIRE WITH TREAD THEREOF

[75] Inventor: Giorgio Agostini, Colmar-Berg, Luxembourg

[73] Assignee: The Goodyear Tire & Rubber Company, Akron, Ohio

[21] Appl. No.: 09/042,354

[22] Filed: Mar. 13, 1998

[51] Int. Cl.⁷ .............................. B60C 11/00; B60C 27/00
[52] U.S. Cl. .................................. 152/209.5; 152/209.4; 152/905; 524/492; 524/493; 524/495; 524/496; 524/488; 524/275
[58] Field of Search ..................... 524/492, 488, 524/493, 495, 496, 275; 152/905, 209.5, 209.4

[56] References Cited

U.S. PATENT DOCUMENTS 4,094,697   6/1978   Rostler ................................ 106/280
5,844,044   12/1998  Sandstrom et al. ................ 525/237

*Primary Examiner*—James J. Seidleck
*Assistant Examiner*—U. K. Rajguru
*Attorney, Agent, or Firm*—Henry C Young Jr

[57] ABSTRACT

This invention relates to a rubber composition and to a tire with tread of rubber composition prepared with filler reinforcement, a majority of which is silica reinforcement, together with a silica coupling agent, and a minority is carbon black and conventional rubber compounding ingredients wherein at least one of said compounding ingredients and/or coupling agent is liquid and is provided as being deposited on a specified carbon black carrier. In particular, the carbon black carrier is characterized by having a DBP value in a range of about 280 to about 600 cm³/100 g and a BET value in a range of about 550 to about 1200 m²/g. The selection of the said carbon black carrier is intended to reduce the electrical volume resistivity of the tread composition.

26 Claims, No Drawings

RUBBER COMPOSITION REINFORCED WITH SILICA AND TIRE WITH TREAD THEREOF

FIELD

The invention relates to a rubber composition and to a tire with a tread of a rubber composition which is substantially reinforced with particulate silica, together with a silica coupling agent for the silica and which contains only a minor amount of carbon black reinforcement.

BACKGROUND

Rubber compositions, including rubber compositions used for tire treads, are sometimes quantitatively reinforced with silica with only a minor amount of carbon black reinforcement.

The electrical conductivity of the rubber silica reinforced rubber composition is substantially reduced where very low levels of carbon black reinforcement are used. Such electrical conductivity reduction may be represented, for example, by an increase in the rubber composition's volume resistivity.

Conventionally, a coupling agent is used in conjunction with the silica to couple the silica to the elastomer(s) of the rubber composition. For liquid coupling agents, a carrier for the coupling agent, such as carbon, might be used to introduce it into the rubber composition where the coupling agent and the silica are subsequently combined in-situ in the rubber composition. In such case, the liquid coupler is pre-deposited on the carbon black prior to mixing it with the rubber composition.

The use of carbon black for such carrier and introduction of coupler and silica separately into the rubber composition is well known to those skilled in such art.

However, the use of relatively low levels of carbon black in the rubber reduces the electrical conductivity of the rubber composition which may be of concern for a tire tread where it is desired for the tire tread to dissipate static electricity build-up in the tire on a vehicle during use or operation of the vehicle over a road.

It is observed that a carbon black having a DBP value in a range of about 70 to about 120 $cm^3/100$ g with a corresponding BET value in a range of about 40 to about 159 $m^2/g$, namely N330 ASTM designated carbon black, is conventionally used as a carrier for liquid silane-based coupling agents for the silica, particularly where the coupling agent is a liquid bis(trialkoxysilylalkyl) polysulfide.

In one aspect of this invention, it is desired to reduce the volume resistivity of a rubber composition which is quantitatively reinforced with silica and only a minimal amount of carbon black, particularly where the rubber composition is to be used as a tire tread for contacting the ground.

Such volume electrical resistivity may suitably be determined by DIN 53682 or ASTM Method D257-92.

STATEMENT AND PRACTICE OF THE INVENTION

In accordance with this invention, a method of preparing a rubber composition is provided which comprises, based on 100 phr of elastomer(s), blending (A) 100 phr of at least one diene-based elastomer, (B) about 35 to about 110, alternatively about 40 to about 90, phr of reinforcing filler composed of about 25 to about 100, alternatively about 40 to about 80, phr of precipitated silica and correspondingly about 10 to about 25, total phr of carbon black, and (C) about 2 to about 20 phr of a pre-formed composite of specified material and specified carbon black, wherein said specified material is selected from a liquid rubber compounding ingredient, solid rubber compounding ingredient, preferably a solid compounding ingredient having a melting point of less than 120° C. or liquid silica coupling agent having a moiety reactive with silanol groups on the surface of said silica and another moiety interactive with said elastomer(s); wherein said liquid and semi-liquid compounding ingredients are selected from at least one of microcrystalline waxes, antidegradants, and vulcanization accelerators and activators; wherein the weight ratio of said specified material contained in said pre-formed composite to said specified carbon black liquid of said pre-formed composite is in a range of about 0.5/1 to about 3/1; and wherein said specified carbon black has a DBP adsorption value in a range of about 280 to about 600 $cm^3/100$ g and a BET value in a range of about 550 to about 1200 $m^2/g$.

In further accordance with this invention an article is provided of a rubber composition, particularly a sulfur vulcanized rubber composition, which is prepared by such method.

In additional accordance with this invention, a tire is provided having at least one component, particularly a sulfur vulcanized component, as a rubber composition prepared by such method.

In further accordance with this invention, a tire is provided having a tread, particularly a sulfur vulcanized tread, of a rubber composition prepared by such method.

As will be hereinafter discussed, it is understood that additional conventional compounding ingredients are mixed with the prescribed materials for the described method to provide a rubber composition, particularly for a tire component such as a tire tread. Such ingredients typically include materials such as zinc oxide, stearic acid, optional processing oils and waxes, antidegradants, as well as curatives which include sulfur and vulcanization accelerators. The assembly of components for a tire, including, for example, a tire tread is molded and vulcanized under conditions of elevated temperature in a suitable mold to ultimately product the tire. This would all be well understood by one having skill in such art upon becoming acquainted with this invention.

Such rubber compounding philosophy is also readily adaptable for preparation of various articles, of rubber compositions, particularly sulfur vulcanized invention as would be understood by one having skill in such art upon becoming acquainted with this invention.

The silica coupling agent may be a sulfur containing organosilicon compound so long as it is liquid at room temperature, or about 23° C. Examples of such sulfur containing organosilicon compounds may be represented by the formula:

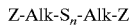

in which Z is selected from the group consisting of

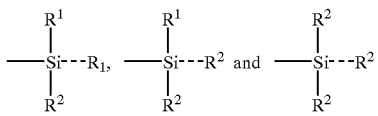

where $R^1$ is selected from alkyl radicals containing from 1 to 4 carbon atoms, cyclohexyl radical or phenyl radical;

$R^2$ is alkoxy radical containing from 1 to 8 carbon atoms, or a cycloalkoxy radical containing from 5 to 8 carbon atoms;

Alk is a divalent hydrocarbon of 1 to 18, preferably from 1 to 6, carbon atoms and n is an integer of 2 to 8. Preferably, n represents an average value of from about 2.1 to about 4, alternatively about 2.1 to about 2.5 for a substantially disulfide form of the polysulfide.

Therefore, as to the above formula, preferably Z is

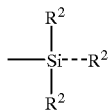

where $R^2$ is an alkoxy radical of 2 to 4 carbon atoms, with 2 carbon atoms being particularly preferred; Alk is a divalent hydrocarbon of 2 to 4 carbon atoms with 3 carbon atoms being particularly preferred; and n is an integer of from 2 to 8, preferably representing an average of from about 2.1 to about 4, alternatively about 2.1 to about 2.5 for the substantially disulfide version of the polysulfide.

Preferred sulfur containing organosilicon compounds are the liquid 3,3'-bis(trimethoxy or triethoxy silylpropyl) polysulfides having an average of about 2.1 to about 4 or, alternatively about 2.1 to about 2.5 sulfur atoms in the polysulfidic bridge such as, for example, 3,3'-bis (triethoxysilylpropyl) tetrasulfide and 3,3'-bis (triethoxysilylpropyl) disulfide.

In general, examples of organosilicon polysulfide compounds which may be used in the practice of this invention include, insofar as they are liquid at 23° C., for example: 3,3'-bis(trimethoxysilylpropyl) disulfide, 3,3'-bis (triethoxysilylpropyl) tetrasulfide, 3,3'-bis (triethoxysilylpropyl) octasulfide, 3,3'-bis (trimethoxysilylpropyl) tetrasulfide, 2,2'-bis (triethoxysilylethyl) tetrasulfide, 3,3'-bis (trimethoxysilylpropyl) trisulfide, 3,3'-bis (triethoxysilylpropyl) trisulfide, 3,3'-bis (tributoxysilylpropyl) disulfide, 3,3'-bis (trimethoxysilylpropyl) hexasulfide, 3,3'-bis (trimethoxysilylpropyl) octasulfide, 3,3'-bis (trioctoxysilylpropyl) tetrasulfide, 3,3'-bis (trihexoxysilylpropyl) disulfide, 3,3'-bis(tri-2"-ethylhexoxysilylpropyl) trisulfide, 3,3'-bis (triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis(tricyclopentoxysilylpropyl) trisulfide, 2,2'-bis (tri-2"-methylcyclohexoxysilylethyl) tetrasulfide, bis(trimethoxysilylmethyl) tetrasulfide, 3-methoxy ethoxy propoxysilyl 3'-diethoxybutoxysilylpropyltetrasulfide, 2,2'-bis(dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl disec. butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis (trimethoxysilylbutyl) tetrasulfide, 6,6'-bis (triethoxysilylhexyl) tetrasulfide, 12,12'-bis (triisopropoxysilyl dodecyl) disulfide, 18,18'-bis (trimethoxysilyloctadecyl) tetrasulfide, 18,18'-bis (tripropoxysilyloctadecenyl) tetrasulfide, 4,4'-bis (trimethoxysilyl-buten-2-yl) tetrasulfide, 4,4'-bis (trimethoxysilylcyclohexylene) tetrasulfide, 5,5'-bis (dimethoxymethylsilylpentyl) trisulfide, 3,3'-bis (trimethoxysilyl-2-methylpropyl) tetrasulfide, 3,3'-bis (dimethoxyphenylsilyl-2-methylpropyl) disulfide.

Representative of liquid or semi-liquid rubber compounding ingredients having a melting point of less than 120° C. are, for example:

1) microcrystalline waxes such as those available commercially, for example, as OKERIN 1887 and OKERIN 7950 from the Astor Wax Corporation of Titusville, Pa.;

2) antiozonants such as those available commercially, for example, NAUGARD-G from the Uniroyal company (Italy) which can be described as a polymerization product of polymerizing 1,2-dihydro-2,2,6-trimethyl quinoline;

3) antioxidants such as those available commercially, for example, WINGSTAY® 100 from The Goodyear Tire & Rubber Company which can be described as aryl-p-phenylene diamine mixture, VULKANOX 3100 from the Bayer AG company which can be described as a diaryl-p-phenylene diamine mixture, VULKANOX 4020 from the Bayer AG company which can be described as N-(1,3 dimethyl butyl)-N'-phenyl-p-phenylenediamine and SANTOFLEX IPPD from the Monsanto Company which can be described as N-phenyl-N'-isopropyl-p-phenylene diamine;

4) vulcanization accelerators such as DURAX from the R. T. Vanderbilt Company, Inc. which can be described as N-Cyclohexyl-2-benzothiazole sulfenamide, AMAX from the R. T. Vanderbilt Company, Inc. which can be described as N-oxydiethylene-2-benzothiazole sulfenamide, SANTOCURE DCBS from the Monsanto Company which can be described as dicyclohexyl-2-benzothiazole sulfenamide, SANTOCURE NS from the Monsanto Company which can be described as N-tert-butyl-2-benzothiazole sulfenamide, and SANTOGARD PUT from the Monsanto Company and 5) vulcanization inhibitor such as SANTOGARD PVI from the Monsanto Company which can be described as N-cyclohexythiophthlimide.

Liquid and solid (or semi-solid) compounding ingredients having a softening point or melting point of less than 120° C. can be applied, for example, by spraying onto the carbon black while those of higher softening points can be applied by organic solvent deposition.

A reference for many of such liquid and solid rubber compounding ingredients may be, for example, *The Vanderbilt Rubber Handbook, Thirteenth Edition*, 1990, pages 295–395.

A particularly dual advantage of using the prescribed carbon black carrier for this invention instead of more conventional carbon blacks is (1) that it is considered herein to be substantially more electrically conductive and, thus, tend to reduce the volume electrical resistivity for the rubber composition of this invention for the same amount of carbon black carrier and, further (2) because it has a substantially greater DBP absorption value may, therefore, be able to adsorb a greater amount of the silane-based coupling agent and, thus, be a more efficient carrier.

Consequently, the philosophy is, by the utilization of the specified carbon black according to this invention, to provide both a means to enhance the electrical conductivity of a quantitatively silica reinforced tire tread rubber composition and, also to provide a more efficient carrier for the liquid coupling agent.

As previously discussed, carbon blacks conventionally used as a carrier for a liquid coupling agent are not equivalent to the carbon blacks specified for use in this invention in a sense that the prior used carbon black(s), particularly the N330 carbon black, have a DBP adsorption value, for example, in a range of about 100 to about 150 $cm^3/100$ g and a BET value, for example, in a range of about 40 to about 159 $m^2/g$. The N330 carbon black has a designated DBP value of about 120 $cm^3/100$ g and a BET value of about 82 $m^2/g$ which is similar to its Iodine adsorption value of about 82 $m^2/g$.

Thus, in the practice of this invention, the required, or specified, carbon black for the liquid compounding ingredient or coupling agent differs substantially from such carbon black carriers in both the DBP (dibutylphthalate oil adsorption) and BET (nitrogen specific surface area) values.

It is appreciated that the DBP (dibutylphthalate) value can be suitably determined by ASTM Method D2414 and the BET value (nitrogen adsorption) can be suitably determined by method described in the Journal of the American Chemical society, Volume 60, page 306 (1930).

Representative of the more conventional carbon black carriers might be, for example, carbon blacks having a ASTM designation such as N330 which has a DBP value of about 120 $cm^3/100$ g and a BET value of about 82 $m^2/g$.

Representative examples of carbon blacks contemplated for use as carriers for the liquid couplers in the practice of this invention are those such as, for example, Corax XE-2 from the Degussa company having a DBP value of about 400 $cm^3/100$ g and a BET value of about 560 $m^2/g$, 23MM from the MMM company having a DBP value of about 300 $cm^3/100$ g and a BET value of about 558 $m^2/g$, Ketjen EC600J and Ketjen EC300J from the AKZO company having a DBP value of about 550 and 360 $cm^3/100$ g respectively and a BET value of about 1040 and 800 $m^2/g$ respectively.

Elastomers contemplated for use in this invention are diene-based elastomers such as homopolymers and copolymers of conjugated dienes such as isoprene and 1,3-butadiene and copolymers of such dienes with a vinyl aromatic compound such as styrene and/or alphamethylstyrene, preferably styrene.

Accordingly, such elastomers may be, for example, cis 1,4-polyisoprene whether natural or synthetic, 3,4-polyisoprene, cis 1,4-polybutadiene, trans 1,4-polybutadiene, high vinyl polybutadiene having about 35 to about 95 percent vinyl 1,2-content, isoprene/butadiene copolymers, butadiene/styrene copolymers, and styrene/isoprene/butadiene terpolymers.

The commonly employed siliceous pigments used in rubber compounding applications can be used as the silica in this invention, including pyrogenic and precipitated siliceous pigments (silica), although precipitate silicas are preferred.

The siliceous pigments preferably employed in this invention are precipitated silicas such as, for example, those obtained by the acidification of a soluble silicate, e.g., sodium silicate.

The siliceous pigment (silica) may, for example, have an ultimate particle size in a range of 50 to 10,000 angstroms, preferably between 50 and 400 angstroms. The BET surface area of the pigment, as measured using nitrogen gas, is in a range of about 80 to about 300, although more usually in a range of about 100 to about 200, although perhaps even up to about 360, square meters per gram. The BET method of measuring surface area is described in the *Journal of the American Chemical Society*, Volume 60, page 304 (1930).

The silica may typically have a dibutylphthalate (DBP) absorption value in a range of about 150 to about 350, and usually about 200 to about 300 $cm^3/100$ g.

The silica might have an average ultimate particle size, for example, in a range of about 0.01 to 0.05 micron as determined by the electron microscope, although the silica particles may be even smaller in size.

Various commercially available silicas may be considered for use in this invention such as, for example only and without limitation, silicas commercially available from PPG Industries under the Hi-Sil trademark with designations 210, 243, etc; silicas available from Rhone-Poulenc such as, for example, Zeosil 1165MP and silicas available from Degussa AG with designations such as, for example, VN2, VN3, BV 3370GR and silicas from J. M. Huber company such as, for example, Hubersil 8745.

It is readily understood by those having skill in the art that the rubber composition of the tread rubber would be compounded by methods generally known in the rubber compounding art, such as mixing the various sulfur-vulcanizable constituent diene polymers with various commonly used additive materials such as, for example, curing aids, such as sulfur, activators, retarders and accelerators, processing additives, such as oils, resins including tackifying resins, and plasticizers, pigments, fatty acid, zinc oxide, waxes, antioxidants and antiozonants, peptizing agents and reinforcing fillers such as, for example, silica and silica-carbon black mix. As known to those skilled in the art, depending on the intended use of the sulfur vulcanizable and sulfur vulcanized compounds or tread compounds, the additives mentioned above are selected and commonly used in conventional amounts.

Typical additions of carbon black and silica for this invention are hereinbefore set forth. The selection of the type of silica and carbon black is well within an optimization skill by one having skill in the rubber compounding for tire treads, depending somewhat upon the intended use, purpose and properties for the tire tread. Typical amounts of tackifier resins, if used, comprise about 0.5 to about 10 phr, usually about 1 to about 5 phr. Typical amounts of processing aids comprise about 1 to about 80 phr. Such processing aids can include, for example, aromatic, naphthenic, and/or paraffinic processing oils or plasticizer or low softening point polyethylene ether glycols. Typical amounts of antioxidants comprise about 1 to about 5 phr. Representative antioxidants may be, for example, diphenyl-p-phenylenediamine and others such as, for example, those disclosed in *The Vanderbilt Rubber Handbook* (1978), pages 344–346. Typical amounts of antiozonants comprise about 1 to 5 phr. Typical amounts of fatty acids, if used, which can include stearic acid comprise about 0.5 to about 4 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide. An antioxidant may be, for example, of the para-phenylene diamine and/or dihydrotrimethylquinoline type.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, with a range of from about one to about 2.5, being preferred.

Accelerators are used to control the time and/or temperature required for vulcanization and to improve the properties of the vulcanizate. Retarders are also used to control the vulcanization on-set. In one embodiment, a single accelerator system may be used, i.e., primary accelerator. Conventionally and preferably, a primary accelerator(s) is used in total amounts ranging from about 0.5 to about 4, preferably about 0.8 to about 2.5, phr. In another embodiment, combinations of a primary and/or a secondary accelerator might be used, with the secondary accelerator being used in amounts of about 0.05 to about 3 phr, for example, in order to activate the cure and to improve the properties of the vulcanizate. Suitable types of accelerators that may be used in the present invention are, for example, amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The selection and amounts of the various compounding ingredients are not considered to be critical for the purposes of this invention, except where they may be especially emphasized elsewhere in this description, and can be adjusted or modified by the practitioner as deemed suitable for the desired tire tread properties.

The tire can be built, shaped, molded and cured by various methods which known or apparent to those having skill in such art.

The rubber composition, or compound, for the tire tread may be prepared, for example, by mixing the ingredients in several sequential non-productive stages (without the sulfur and associated accelerator(s) curatives together with antidegradant(s) to temperatures of about 165° C. followed by a final productive mixing stage to a temperature of about 105° C. in which the curatives and antidegradants are added. An internal rubber mixer (Banbury type) is used. The resulting rubber compounds may then be extruded to form tread strips which, in turn, may be built onto a tire carcass and the resulting assembly vulcanized in a suitable mold at a temperature of about 150° C. to form a tire.

EXAMPLE I

Pre-formed composites of a liquid silica coupler and specified carbon black carrier are prepared by spraying the liquid coupler onto the granular carbon black at about 50° C.

Such composites were prepared in weight ratios of 3/1 and 1/1 of coupler to carbon black. The composites are shown in the following Table 1 and are referred to therein as Composite X and Composite Y.

TABLE 1

|  | Composite X | Composite Y |
|---|---|---|
| Si69[1] | 3 | 1 |
| 23MM[2] | 1 | 1 |
| Si69/23MM[3] | 3/1 | 1/1 |

[1])A liquid bis 3-(triethoxysilylpropyl) tetrasulfide available from Degussa AG.

TABLE 1-continued

|  | Composite X | Composite Y |
|---|---|---|

[2])A carbon black as available as 23MM from the M.M.M., N.V company, having a BET surface area of about 558 $m^2/g$ and a DBP value of about 236 ml/g.
[3])A composite of the liquid bis-3-(triethoxysilylpropyl) tetrasulfide available as Si69 from Degussa AG and 23MM carbon black from M.M.M. company prepared by spraying the liquid tetrasulfide onto the granular carbon black at about 23° C. Such composite is prepared in a 1/1 weight ratio and in a 3/1 weight ratio of said liquid tetrasulfide and said carbon black.

EXAMPLE II

Rubber compositions were prepared utilizing the pre-formed coupler/carbon black composites of Example I. The rubber composition used is shown in Table 2 and more detailed additions of silica and silica coupler composites are shown in Table 2.

For the rubber composition, the ingredients are first mixed in at least one non-productive mixing stage for about 7 minutes to a temperature of about 160° C. The non-productive mix stages refer to the mixing of the ingredients without the curatives such as sulfur and vulcanization accelerators. The term "non-productive" mixing is well known to those having skill in such art. Then the curatives are mixed in a final mixing stage for about two minutes to a temperature of about 120° C.

TABLE 2

| Non-Productive Mix Stages | Parts |
|---|---|
| E-SBR[1] | 25 |
| Isoprene/Butadiene[2] Rubber | 45 |
| BR[3] | 20 |
| Natural Rubber[4] | 10 |
| Processing Aids[5] | 25 |
| Fatty Acid[6] | 2 |
| Silica[6] | variable |
| Added Carbon Black[7] | variable |
| Composite-Coupling Agent[8] | variable |
| Productive Mix Stage | |
| Sulfur | 1 |
| Zinc Oxide | 4 |
| Antioxidant(s) | 3 |
| Sulfenamide and Thiuram Type Accelerators | 4 |

[1])Emulsion polymerization prepared SBR obtainable from The Goodyear Tire & Rubber Company having styrene content of about 40 percent.
[2])Isoprene/butadiene copolymer elastomer having a Tg of about −45° C. and an isoprene content of about 50 percent obtainable from The Goodyear Tire & Rubber Company.
[3])Cis 1,4-polybutadiene rubber obtainable as BUDENE ® 1207 from The Goodyear Tire & Rubber Company.
[4])Natural rubber (cis 1,4-polyisoprene).
[5])Rubber processing oil as being about 9.4 parts in the E-SBR, where the amount of E-SBR is reported above on a dry weight (without the oil) and in addition, about 15 parts additional rubber processing oil, plasticizers, resins and waxes were added.
[6])Primarily stearic acid.
[7A])N330.
[7B])23MM carbon black from the M.M.M. NV company.
[8])Composites of bis-3-(triethoxysilylproypl) tetrasulfide and carbon black.

The pre-formed silica coupler/carbon black composites are mixed with the rubber composition of Table 2 as shown in Table 3. The values are reported in terms of parts by weight to be included for the rubber composition of Table 2.

TABLE 3

|  | Exp A. Ctrl | Exp B | Exp C | Exp D | Exp E |
| --- | --- | --- | --- | --- | --- |
| Silica[1] | 83 | 43 | 43 | 43 | 43 |
| X50S[2] | 13.28 | 9 | 0 | 0 | 0 |
| Si69[3] |  |  |  |  | 4.5 |
| Carbon black[4] | 6.64 | 4.5 |  |  |  |
| Carbon black[5] | 0 | 20 | 18 | 24.5 | 20 |
| Composite X[6] | 0 | 0 | 9 | 0 | 0 |
| Composite Y[7] | 0 | 0 | 0 | 0 | 6 |
| Total black[8] | 6.64 | 24.5 | 22.5 | 24.5 | 21.5 |
| Electrical volume resistivity |  |  |  |  |  |
| ohm · cm | >$10^{15}$ | >$4*10^3$ | >$8*10^4$ | >$2*10^4$ | >$2*10^5$ |

[1] Silica obtained as Zeosil 1165MP from the Rhone Poulenc company.
[2] A composite composed of 50/50, by weight, of a silica coupler composite as a composition of N330 carbon black and bis-3-(triethoxysilylpropyl) tetrasulfide commercially available as X50S from Degussa AG.
[3] Liquid bis-3-(triethoxysilylpropyl) tetrasulfide obtainable as Si69 from Degussa AG
[4] The N330 carbon black content included in the said X50S having a BET (nitrogen) value of about 80 m²/g and a DBP value of about 100 ml/100 g
[5] Carbon black added as free carbon black available from the M.M.M NV company, having a BET (nitrogen) surface area of about 558 m²/g and a DBP value of about 236 ml/100 g.
[6] Pre-formed composite X from Example I (Table 1) as a silica coupler composite, in a 3/1 weight ratio of bis-3-(triethoxysilylpropyl) tetrasulfide and 23MM carbon black.
[7] Pre-formed composite Y from Example I (Table 1) as a silica coupler composite, in a 1/1 weight ratio of bis-3-(triethoxysilylpropyl) tetrasulfide and 23MM carbon black.
[8] Total amount of carbon black in the rubber composition as the sum of free carbon black added carbon black contained in the added silica coupler pre-formed composites.

For the Control rubber composition (Exp A), about 13 phr of a conventional pre-formed coupler/carbon black was used for the rubber composition which contained about 6.6 phr of a conventional carbon black (N330).

For the Exp B rubber sample, only about 9 phr of the conventional pre-formed coupler/carbon black was used with an attendant amount of about 4.5 phr of conventional N330 carbon black contained therein. However, 20 phr of 23MM carbon black was added to the rubber composition to reduce the rubber composition's electrical resistivity.

For the Exp C rubber composition, a pre-formed coupler/23MM carbon black composite was used for the added coupler in a ratio of 3/1 (coupler/carbon black) instead of the more conventional coupler/N330 carbon black in a 1/1 weight ratio.

For Exp D, the coupler and about 25 phr of 23MM carbon black were added independently (in-situ) to the rubber composition and no pre-formed coupler/carbon black composite was added.

EXAMPLE IV

The rubber compositions of Example III were cured for about 14 minutes to a temperature of about 160° C. Various physical properties of the rubber compositions were measured and reported in the following Table 4.

TABLE 4

| Property | Exp A Ctrl | Exp B | Exp C | Exp D | Exp E |
| --- | --- | --- | --- | --- | --- |
| $T_{25}$ (min) | 7 | 6.8 | 6.8 | 6.5 | 7.1 |
| $T_{90}$ (min) | 12 | 10 | 10.9 | 9.8 | 11.8 |
| 300% Modulus (MPa) | 9 | 12 | 11 | 13 | 10 |
| Tensile (MPa) | 16 | 14 | 15 | 13.5 | 15.7 |
| Elongation (%) | 590 | 390 | 480 | 340 | 502 |
| Rebound (100° C.) | 60 | 55 | 59 | 53 | 61 |
| Rebound (23° C.) | 37 | 32 | 37 | 32 | 38 |
| Hardness, Shore A | 67 | 68 | 67 | 69 | 66 |
| ohm · cm[1] | >$10^{15}$ | >$4.10^3$ | >$8.10^4$ | >$2.10^4$ | >$2.10^5$ |

[1] Electrical resistance expressed as volume resistivity (ohm.cm) may be determined by DIN 53682 or ASTM D257-92. — of the rubber composition after being cured for about 14 minutes to a temperature of about 160°.

The overall physical properties of the Exp B rubber sample are somewhat deteriorated as compared to those of the Exp A (Control) rubber sample. The electrical resistance property was significantly reduced at the expense of hysteretical properties.

In particular, the tensile strength and elongation values are lower for the Exp B sample. Generally, lower ultimate tensile strength and ultimate elongation for a rubber sample usually decreases its utility, somewhat, for use as a road-contacting tire tread.

Further, the hysteretic losses, namely the hot and cold rebound values, are higher for the Exp B rubber sample as compared to the Exp A Control sample. Generally, higher hysteretic losses for a rubber composition may result in higher heat generation in a road-contacting tire tread.

It may be concluded herein that the amount of 23MM carbon black added to promote an increase in the rubber composition's electrical conductivity (a decrease in its volume resistivity) favorably for Exp B affected the aforesaid physical properties of the rubber composition insofar as its usefulness for a tire tread.

The overall rubber composition physical properties of Exp C rubber samples shows that, in comparison to Exp A (the Control) rubber sample, the strength (tensile and elongation values) and the hysteretic properties (hot and cold rebound values) are somewhat deteriorated but less than those of the Exp B rubber sample which used a conventional preformed coupler/carbon black composite. The electrical resistivity property was still low enough for discharging static charges.

Therefore, it is concluded herein that (1) the reduction in total amount of carbon black in the rubber composition is mandatory or essential to achieve the good physical properties of the Exp A (Control) rubber composition and, further, that the use of the pre-formed coupler/23MM carbon black acted to substantially reduce the electrical volume resistivity as well as reducing the impact on physical properties.

The overall physical properties of the Exp D rubber samples show that, as compared to the Exp A (Control) rubber sample, if all of the added carbon black is 23MM carbon black and in the amount used in the rubber composition of Exp B, the physical properties are reduced to a greater extent. The electrical resistivity property was comparable to Exp B.

Therefore, it is concluded herein that a minimum amount of the 23MM carbon black, and of carbon black in general, is needed in order to achieve satisfactory physical properties such as tensile, elongation and hot and cold rebound values for the rubber composition.

For the Exp E sample, a preformed coupler/23MM carbon black was used in a ratio of 3/1 (coupler/carbon black) Also, about 20 phr of the 23MM carbon black was added to the rubber composition.

The overall physical properties of the Exp E sample shows that, in comparison with the Exp's A (Control), B and C rubber samples that when all the carbon black is the 23MM carbon black and the coupler is used in a ratio of 3:1 (carbon black to coupler) the tensile, elongation and hot and cold rebound properties are essentially equivalent to the Exp A (Control) properties and, further, that the electrical resistance is satisfactory. Exp. E has the lowest total amount of carbon black.

While certain representative embodiments and details have been shown for the purpose of illustrating the invention, it will be apparent to those skilled in this art that various changes and modifications may be made therein without departing from the spirit or scope of the invention.

What is claimed is:

1. A method of preparing a rubber composition which comprises, based upon 100 phr of elastomer(s), blending ingredients comprised of (A) 100 phr of at least one diene-based elastomer, (B) about 35 to about 110 phr of reinforcing filler comprised of about 25 to about 100 phr of precipitated silica and correspondingly about 10 to about 25 total phr of carbon black, and (C) about 2 to about 20 phr of pre-formed composite of specified material and specified carbon black, wherein said specified material is a liquid or semi-liquid material having a softening point of less than 120° C. selected from the group consisting of:

A. microcrystalline wax,
B. silica coupling agent,
C. antidegradant, and
D. vulcanization accelerator;

wherein said silica coupling agent has a moiety reactive with silanol groups on the surface of said silica and another moiety interactive with said elastomer(s); wherein the weight ratio of said specified material to said carbon black of said pre-formed composite is in a range of about 0.5/1 to about 3/1; and wherein said carbon black of said pre-formed composite has a DBP adsorption value in a range of about 280 to about 600 cm$^3$/100 g and a BET value in a range of about 550 to about 1200 m$^2$/g; and wherein said pre-formed composite is prepared by coating said specified material onto the surface of said carbon black.

2. The method of claim 1, wherein said liquid or semi-liquid material is microcrystalline wax(s).

3. The method of claim 1 wherein said liquid or semi-liquid material for said pre-formed composite is a silica coupling agent as a 3,3"(trialkoxysilylalkyl) polysulfide having an average of from 2 to 4 sulfur atoms in its polysulfidic bridge and which is liquid at 23° C.

4. The method of claim 1 wherein said liquid or semi-liquid material for said pre-formed composite is a silica couping agent selected from the group consisting of at least one of 3,3'-bis(trimethoxysilylpropyl) polysulfide and 3,3'bis(triethoxysilylpropyl) polysulfide having an average of about 2.1 to about 4 sulfur atoms in the polysulfidic bridge.

5. The method of claim 3 wherein said silica coupling agent is 3,3'-bis(triethoxysilylpropyl) polysulfide having an average of about 3.5 to about 4.0 sulfur atoms in its polysulfidic bridge or 3,3'-bis(triethoxysilylpropyl) having an average of from 2.1 to about 2.4 sulfur atoms in its polysulfidic bridge.

6. The method of claim 1 wherein said silica coupling agent for said pre-formed composite, so long as it is liquid at 23° C., is selected from the group consisting of 3,3'-bis (trimethoxysilylpropyl) disulfide, 3,3'-bis (triethoxysilylpropyl) tetrasulfide, 3,3'-bis (triethoxysilylpropyl) octasulfide, 3,3'-bis (trimethoxysilylpropyl) tetrasulfide, 2,2'-bis (triethoxysilylethyl) tetrasulfide, 3,3'-bis (trimethoxysilylpropyl) trisulfide, 3,3'-bis (triethoxysilylpropyl) trisulfide, 3,3'-bis (tributoxysilylpropyl) disulfide, 3,3'-bis (trimethoxysilylpropyl) hexasulfide, 3,3'-bis (trimethoxysilylpropyl) octasulfide, 3,3'-bis (trioctoxysilylpropyl) tetrasulfide, 3,3'-bis (trihexoxysilylpropyl) disulfide, 3,3'-bis(tri-2"-ethylhexoxysilylpropyl) trisulfide, 3,3'-bis (triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis(tricyclopentoxysilylpropyl) trisulfide, 2,2'-bis(tri-2"-methylcyclohexoxysilylethyl) tetrasulfide, bis (trimethoxysilylmethyl) tetrasulfide, 3-methoxy ethoxy propoxysilyl 3'-diethoxybutoxysilylpropyltetrasulfide, 2,2'-bis (dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclobexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec. butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'bis (trimethoxysilylbutyl) tetrasulfide, 6,6'-bis (triethoxysilylhexyl) tetrasulfide, 12,12'bis (triisopropoxysilyl dodecyl) disulfide, 18,18'-bis (trimethoxysilyloctadecyl) tetrasulfide, 18,18'-bis (tripropoxysilyloctadecenyl) tetrasulfide, 4,4'-bis (trimethoxysilyl-buten-2-yl) tetasulfide, 4,4'-bis (trimethoxysilylcyclohexylene) tetrasulfide, 5,5'-bis (dimethoxymethylsilylpentyl) trisulfide, 3,3'-bis (trimethoxysilyl-2-methylpropyl) tetrasulfide, and 3,3'-bis (dimethoxyphenylsilyl-2-methylpropyl) disulfide.

7. The method of claim 1 wherein said diene-based rubber is selected from the group consisting of synthetic and natural cis 1,4-polyisoprene, cis 1,4-polybutadiene, trans 1,4-polybutadiene, high vinyl polybutadiene having a vinyl 1,2-content in a range of about 35 to about 95 percent, isoprene/butadiene copolymers, butadiene/styrene copolymers and styrene/isoprene/butadiene terpolymers.

8. The method of claim 1 wherein a pre-formed composite of said coupler and carbon black and a pre-formed composite of said compounding ingredient and carbon black are used.

9. An article comprised of a rubber composition prepared by the method of claim 1.

10. An article comprised of a rubber composition prepared by the method of claim 2.

11. An article comprised of a rubber composition prepared by the method of claim 3.

12. An article comprised of a rubber composition prepared by the method of claim 4.

13. An article comprised of a rubber composition prepared by the method of claim 5.

14. An article comprised of a rubber composition prepared by the method of claim 6.

15. An article comprised of a rubber composition prepared by the method of claim 7.

16. An article comprised of a rubber composition prepared by the method of claim 8.

17. A tire having a component comprised of a rubber prepared by the method of claim 1.

18. A tire having a tread comprised of a rubber composition prepared by the method of claim 1.

19. A tire having a tread comprised of a sulfur vulcanized rubber composition prepared by the method of claim 1.

20. A tire having a tread comprised of a sulfur vulcanized rubber composition prepared by the method of claim 2.

21. A tire having a tread comprised of a sulfur vulcanized rubber composition prepared by the method of claim 3.

22. A tire having a tread comprised of a sulfur vulcanized rubber composition prepared by the method of claim 4.

23. A tire having a tread comprised of a sulfur vulcanized rubber composition prepared by the method of claim 5.

24. A tire having a tread comprised of a sulfur vulcanized rubber composition prepared by the method of claim 6.

25. A tire having a tread comprised of a sulfur vulcanized rubber composition prepared by the method of claim 7.

26. A tire having a tread comprised of a sulfur vulcanized rubber composition prepared by the method of claim 10.

* * * * *